United States Patent [19]

Steckel

[11] 4,176,482
[45] Dec. 4, 1979

[54] EAR TAG

[76] Inventor: Lester M. Steckel, Box 235, Taylor, Nebr. 68879

[21] Appl. No.: 876,056

[22] Filed: Feb. 8, 1978

[51] Int. Cl.² ............................................. G09F 3/00
[52] U.S. Cl. .................................................. 40/301
[58] Field of Search ................ 40/300, 301, 302, 20 R

[56] References Cited
U.S. PATENT DOCUMENTS

| | | | |
|---|---|---|---|
| 2,940,199 | 6/1960 | Goldberg | 40/301 |
| 3,461,586 | 8/1969 | Yauney et al. | 40/300 |
| 3,670,438 | 6/1972 | Carroll et al. | 40/600 |
| 3,900,981 | 8/1975 | Nichols | 40/300 |
| 3,952,438 | 4/1976 | Propst et al. | 40/300 |

FOREIGN PATENT DOCUMENTS

| | | | |
|---|---|---|---|
| 251292 | 4/1964 | Australia | 40/301 |
| 681381 | 10/1952 | United Kingdom | 40/301 |

Primary Examiner—Louis G. Mancene
Assistant Examiner—Wenceslao J. Contreras
Attorney, Agent, or Firm—Zarley, McKee, Thomte, Voorhees & Sease

[57] ABSTRACT

An animal ear tag comprising a flat identification area having a pair of flat supporting arms or straps extending therefrom in a parallel spaced-apart relationship and adapted to receive the animal's ear therebetween. Each of the supporting arms has an opening formed therein adjacent the end thereof which are adapted to receive a pin extending through the openings and the animal's ear positioned therebetween to maintain the tag on the animal's ear. The flat identification area has a peripheral visual acuity border formed thereon spaced inwardly from the periphery thereof which has the same color as the identifying indicia on the identification area.

8 Claims, 6 Drawing Figures

U.S. Patent   Dec. 4, 1979   4,176,482
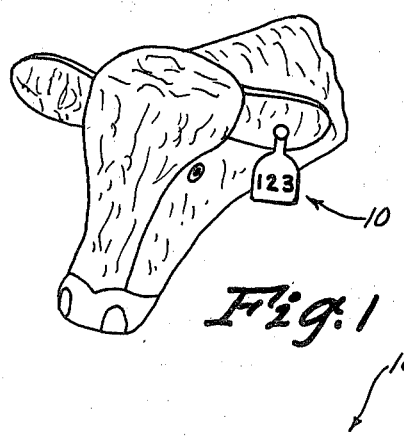
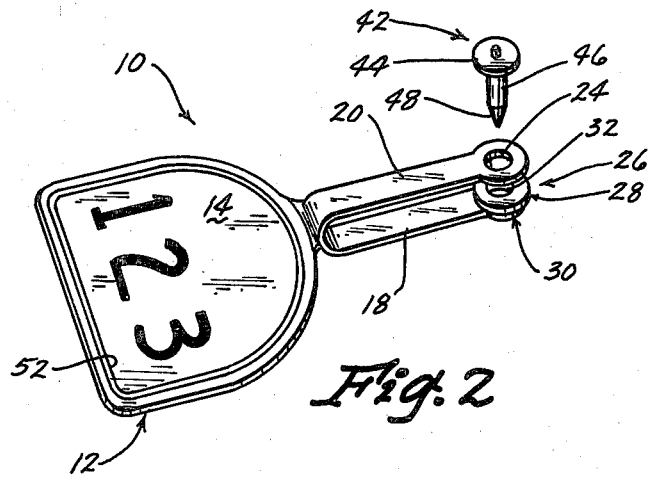
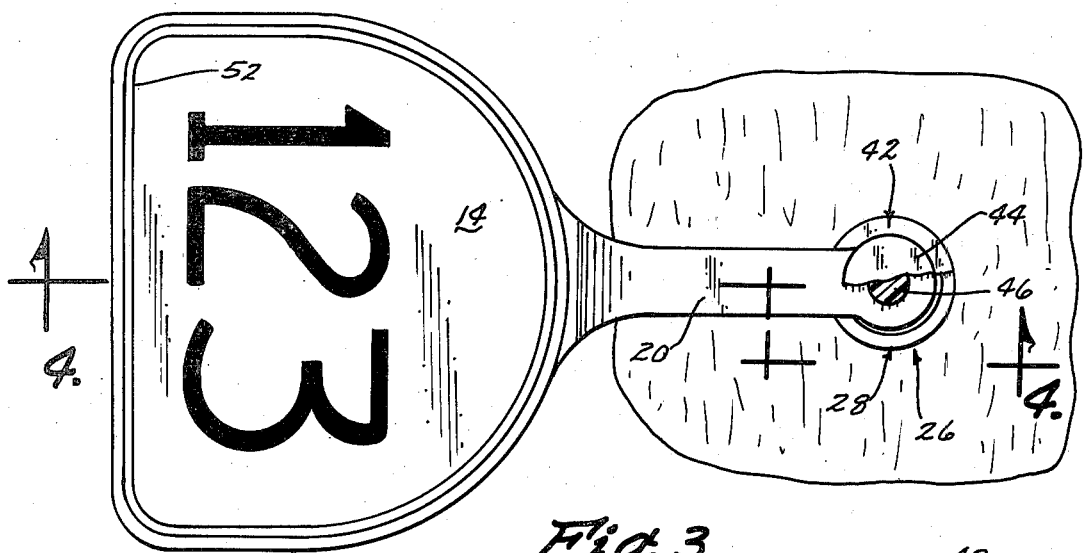
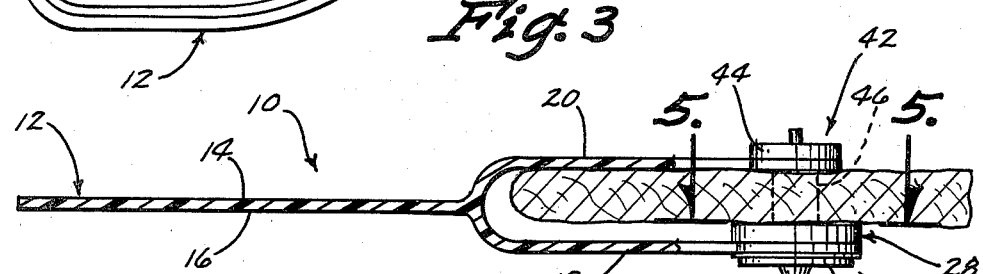
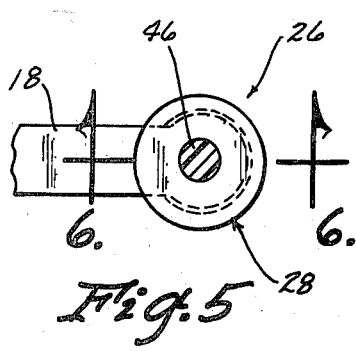
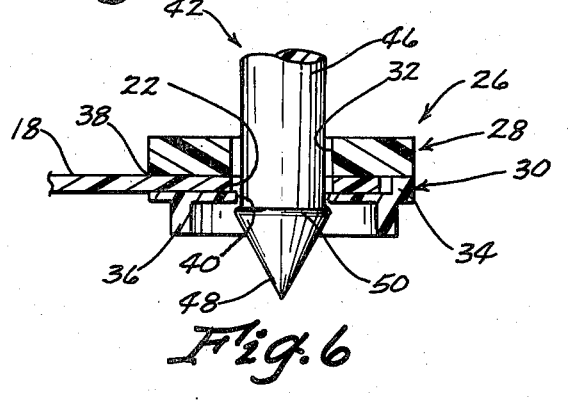

EAR TAG

BACKGROUND OF THE INVENTION

Animal ear tags are commonly secured to an animal's ear to aid in the identification thereof. Many types of ear tags have been previously disclosed but have many shortcomings. One of the disadvantages of the prior animal ear tags is that the identification numbers thereon are difficult to read. A further disadvantage in certain of the prior devices is that a dagger-like device is employed to pierce the animal's ear with the tag then being extended through the opening formed n the animal's ear. The subsequent use of the dagger-like device on other animals creates the possibility of spreading infection from one animal to another unless the dagger-like device is sterilized between each animal.

Therefore, it is a principal object of the invention to provide an improved animal ear tag.

A still further object of the invention is to provide an animal ear tag having identifying indicia on both sides thereof.

A still further object of the invention is to provide an animal ear tag which has a peripheral visual acuity border formed thereon extending around the periphery of the identification area.

A still further object of the invention is to provide an animal ear tag including novel means for securing the same to the animal's ear.

A still further object of the invention is to provide an animal ear tag including attachment means which prevents the spread of infection from one animal to another.

A still further object of the invention is to provide an animal ear tag which is economical of manufacture, durable in use and refined in appearance.

BRIEF DESCRIPTION OF THE DRAWINGS

FIG. 1 is a perspective view of an animal having the ear tag of this invention secured thereto:

FIG. 2 is a perspective view of the ear tag of this invention:

FIG. 3 is a top view of the ear tag secured to the animal's ear.

FIG. 4 is a sectional view of the ear tag as seen on line 4—4 of FIG. 3.

FIG. 5 is a sectional view seen on lines 5—5 of FIG. 4; and

FIG. 6 is a sectional view seen on lines 6—6 of FIG. 5.

SUMMARY OF THE INVENTION

The animal ear tag disclosed herein comprises a flat identification area having a pair of spaced-apart straps or arms extending from one end thereof in a parallel spaced-apart relationship. The outer ends of the straps are provided with openings formed therein. A retainer disc is secured to one of the supporting arms and has an opening formed therein adapted to receive a pin extending through the other supporting arm and the animal's ear. The pin not only provides the means for securing the tag to the animal's ear but also creates the opening in the animal's ear as the pin is attached.

DESCRIPTION OF THE PREFERRED EMBODIMENT

The ear tag of this invention is referred to generally by the reference numerl 10 and comprises a flat identification member or area 12 having opposite sides 14 and 16. A pair of spaced-apart supporting arms or straps 18 and 20 extend from identification member 12 as seen in the drawings and are provided with openings 22 and 24 adjacent the ends thereof. As seen in the drawings, the ends of the supporting arms 18 and 20 are provided with enlarged circular portions.

The numeral 26 refers generally to a retainer disc which is comprised of disc members 28 and 30. Disc member 28 is flat and is provided with a central opening 32 formed therein. Disc 28 is positioned above (as viewed in the drawings) the supporting arm 18 so that opening 32 registers with opening 22. Disc member 30 is comprised of an upper cup-shaped portion 34 having an annular ring 36 extending downwardly therefrom. Cup-shaped portion 34 has an opening 38 formed in the side thereof which receives supporting arm 18. Portion 34 also is provided with a central opening 40 which registers with opening 22. The retainer disc 26 is secured to the supporting arm 18 by positioning disc member 28 above supporting arm 18 and positioning disc member 38 below supporting arm 18 so that supporting arm 18 extends through the side opening 38. The disc members 28 and 30 and the supporting arm 18 are then sonically welded together so that the retainer will remain on the supporting arm 18.

The numeral 42 refers to the pin having a flat disc member 44 and a shank portion 46 extending therefrom. Shank portion 46 is provided with a diamond-shaped ear piercing portion 48 on the lower end thereof. Shank portion 48 is also provided with a slightly enlarged retainer portion 50 positioned above the ear piercing portion 48. The diameter of retainer portion 50 is slightly greater than the diameter of central opening 40 of disc member 30 to enable the retainer portion 50 to be forced through the central opening 40 during the attachment process with the retainer portion 50 then preventing the inadvertent removal of the pin from the tag and ear.

The tag is secured to the animal's ear by positioning the supporting arms 18 and 20 on opposite sides of the animal's ear. A tagging pliers such as disclosed in the co-pending application simultaneously filed herewith entitled AN ANIMAL TAG PLIERS is employed to force the pin 42 through the animal's ear. The pin 42 is extended through the opening 24 in supporting arm 20 and forced through the animal's ear until the retainer portion 50 "snaps" through the central opening 40 in disc member 30. The pin 46 not only maintains the tag on the animal's ear but also creates the opening in the animal's ear. Since the tagging pliers do not come into contact with the animal's ear, the spread of infection is prevented from one animal to another.

Identifying indicia is positioned on both sides of the identification area 12 so that the tag may be read from either the front or rear of the animal. Preferably, a visual acuity border 52 is provided on both sides of the identification area spaced inwardly from the periphery thereof as illustrated in the drawings. The border 52 has the same color as the identification indicia thereon and it has been found that the use of the border aids in reading the animal tag.

Preferably, the tag is comprised of polyurethane while the pin 42 and retainer disc 26 are comprised of a nylon material.

Thus it can be seen that the device accomplishes at least all of its stated objectives.

I claim:

1. An animal ear tag comprising, a flat identification area having a pair of flat supporting arms extending therefrom in a parallel spaced-apart relationship adapted to receive the animal's ear therebetween, each of said supporting arms having an opening formed therein adjacent the end thereof, and a pin means extending through said openings and the animal's ear positioned therebetween to maintain the tag on the animal's ear, said pin means including a shank portion having a pointed ear piercing portion on one end thereof, said shank portion having an enlarged retainer portion inwardly of said pointed ear piercing portion, said pin means including a retainer disc means detachably secured to said shank a retainer disc means detachably secured to said shank portion inwardly of said enlarged retainer portion.

2. The tag of claim 1 wherein said retainer disc means is snap-fitted onto said shank portion.

3. The tag of claim 2 wherein said retainer disc means has a central opening formed therein which receives said shank portion, said central opening having a diameter less than the diameter of said retainer portion to permit said retainer disc means to be snap-fitted onto said shank portion.

4. The tag of claim 3 wherein said shank portion has a flat first disc at its other end.

5. The tag of claim 3 wherein said retainer disc is secured to one of said supporting arms, said shank portion extending through the other supporting arm, the animal's ear and said retainer disc.

6. The tag of claim 5 wherein said retainer disc comprises a first disc member positioned on one side of said supporting arm, a second disc member secured to said first disc member, said one supporting arm extending into said second disc member and being secured thereto, said first and second disc members having openings formed therein which register with the opening in said one supporting arm.

7. An animal ear tag comprising, a flat identification area having a pair of flat supporting arms extending therefrom in a parallel spaced-apart relationship adapted to receive the animal's ear therebetween, each of said supporting arms having an opening formed therein adjacent the end thereof, and a pin means extending through said openings and the animal's ear positioned therebetween to maintain the tag on the animal's ear, said flat identification area having a peripheral visual acuity border thereon spaced inwardly from the periphery thereof.

8. The tag of claim 7 wherein said border has the same color as the identifying indicia on said identification area.

* * * * *